US010055706B2

(12) United States Patent
Thramann

(10) Patent No.: US 10,055,706 B2
(45) Date of Patent: Aug. 21, 2018

(54) ELECTRIC VEHICLE CHARGING STATION ADAPTED FOR THE DELIVERY OF GOODS AND SERVICES

(71) Applicant: Jeff Thramann, Longmont, CO (US)

(72) Inventor: Jeff Thramann, Longmont, CO (US)

(*) Notice: Subject to any disclaimer, the term of this patent is extended or adjusted under 35 U.S.C. 154(b) by 325 days.

(21) Appl. No.: 15/047,474

(22) Filed: Feb. 18, 2016

(65) Prior Publication Data

US 2017/0024686 A1   Jan. 26, 2017

Related U.S. Application Data

(63) Continuation of application No. 13/623,723, filed on Sep. 20, 2012, now Pat. No. 9,275,391.

(60) Provisional application No. 61/537,346, filed on Sep. 21, 2011, provisional application No. 61/608,439, filed on Mar. 8, 2012.

(51) Int. Cl.
| | |
|---|---|
| *G06Q 10/08* | (2012.01) |
| *G06Q 30/00* | (2012.01) |
| *G06Q 20/10* | (2012.01) |
| *H02J 7/35* | (2006.01) |

(52) U.S. Cl.
CPC .......... *G06Q 10/083* (2013.01); *G06Q 20/10* (2013.01); *G06Q 30/00* (2013.01); *H02J 7/35* (2013.01)

(58) Field of Classification Search
CPC ..................................... G06Q 30/06
USPC ...................................... 705/26.1
See application file for complete search history.

(56) References Cited

U.S. PATENT DOCUMENTS

| 5,315,227 A | 5/1994 | Pierson et al. |
|---|---|---|
| 5,563,491 A | 10/1996 | Tseng |
| 5,816,443 A | 10/1998 | Bustos |
| 5,847,537 A | 12/1998 | Parmley, Sr. |
| 6,253,956 B1 | 7/2001 | Khan et al. |

(Continued)

FOREIGN PATENT DOCUMENTS

| JP | 2007020260 A | 1/2007 |
|---|---|---|
| JP | 2010-114988 A | 5/2010 |

(Continued)

OTHER PUBLICATIONS

Korean Intellectual Property Office; International Search Report and Written Opinion for PCT/US2012/056327; dated Feb. 28, 2013; 7 pp.

(Continued)

*Primary Examiner* — Mila Airapetian
(74) *Attorney, Agent, or Firm* — Perkins Coie LLP

(57) ABSTRACT

The present application provides a solar canopy station having a processor. The processor receives requests for delivery of goods or services and transmits the delivery request to a provider along with information regarding the processor location. The provider provides the requested goods or services. The station also is provided with a mechanism to couple the solar canopy to a battery, which may be a vehicle battery such as an electric car or electric scooter. The solar canopy would provide electrical energy either directly to the battery or through a power conditioner and, optionally, a storage facility. The solar canopy, storage facility, or power conditioner may be provided to power equipment associated with providing services such as, for example, power refrigeration units or freezer units to allow delivery of perishable and frozen goods.

18 Claims, 6 Drawing Sheets

(56) References Cited

U.S. PATENT DOCUMENTS

| | | |
|---|---|---|
| 6,263,316 B1 | 7/2001 | Khan et al. |
| 6,263,674 B1 | 7/2001 | Fileman et al. |
| 7,047,902 B1 | 5/2006 | Little |
| 7,343,174 B2 | 3/2008 | Suryanarayana et al. |
| 7,619,514 B1 | 11/2009 | Stone |
| 7,895,797 B2 | 3/2011 | Bridgman et al. |
| 8,011,140 B2 | 9/2011 | Durham |
| 2002/0102993 A1 | 8/2002 | Hendrey et al. |
| 2003/0146235 A1 | 8/2003 | Peeler |
| 2003/0201931 A1 | 10/2003 | Durst et al. |
| 2005/0228583 A1 | 10/2005 | Capuano |
| 2007/0150592 A1 | 6/2007 | Bell |
| 2008/0114856 A1 | 5/2008 | Kendall |
| 2008/0140520 A1 | 6/2008 | Hyder et al. |
| 2008/0208680 A1 | 8/2008 | Cho |
| 2009/0079388 A1 | 3/2009 | Reddy |
| 2009/0144150 A1 | 6/2009 | Sakakibara et al. |
| 2009/0313104 A1 | 12/2009 | Hafner et al. |
| 2010/0225266 A1 | 9/2010 | Hartman |
| 2010/0283426 A1 | 11/2010 | Redmann |
| 2011/0011930 A1 | 1/2011 | Starr et al. |
| 2011/0015814 A1 | 1/2011 | Starr et al. |
| 2011/0015821 A1 | 1/2011 | Tran |
| 2011/0015934 A1 | 1/2011 | Rowe et al. |
| 2011/0022467 A1 | 1/2011 | Carney, II et al. |
| 2011/0035261 A1 | 2/2011 | Handler |
| 2011/0068739 A1 | 3/2011 | Smith |
| 2011/0071932 A1 | 3/2011 | Agassi et al. |
| 2011/0074346 A1 | 3/2011 | Hall et al. |
| 2011/0077809 A1 | 3/2011 | Leary |
| 2011/0085322 A1 | 4/2011 | Myer |
| 2011/0115425 A1* | 5/2011 | Olsson ............... B60L 3/0046 320/101 |
| 2011/0140656 A1 | 6/2011 | Starr et al. |
| 2011/0191186 A1 | 8/2011 | Levy et al. |
| 2011/0204847 A1 | 8/2011 | Turner |
| 2012/0109798 A1* | 5/2012 | Shelton ............. B60L 3/0069 705/34 |
| 2012/0232714 A1* | 9/2012 | Ricket ................. G06F 1/26 700/297 |

FOREIGN PATENT DOCUMENTS

| | | |
|---|---|---|
| KR | 20090081066 A | 7/2009 |
| WO | WO-01-18984 A1 | 3/2001 |
| WO | WO-0193551 A2 | 12/2001 |

OTHER PUBLICATIONS

Korean Intellectual Property Office; International Search Report and Written Opinion for PCT/US2012/056390; dated Mar. 11, 2013; 8 pp.

Korean Intellectual Property Office; International Search Report and Written Opinion for PCT/US2012/056633; dated Mar. 18, 2013; 9 pp.

* cited by examiner

ELECTRIC VEHICLE CHARGING STATION ADAPTED FOR THE DELIVERY OF GOODS AND SERVICES

CLAIM OF PRIORITY UNDER 35 U.S.C. § 119

The present application claims priority to U.S. Provisional Patent Application Ser. No. 61/537,346, filed Sep. 21, 2011, U.S. Provisional Patent Application Ser. No. 61/608,439, filed Mar. 8, 2012, which are both incorporated herein by reference as if set out in full.

CLAIM OF PRIORITY UNDER 35 U.S.C. § 120

None.

REFERENCE TO CO-PENDING APPLICATIONS FOR PATENT

The present application for patent is related to U.S. Provisional Patent Application Ser. No. 61/537,319, filed Sep. 21, 2011, and U.S. Provisional Patent Application Ser. No. 61/537,346, filed Sep. 21, 2011, and U.S. Provisional Patent Application Ser. No. 61/537,412, filed Sep. 21, 2011, and U.S. Provisional Patent Application Ser. No. 61/621,250, filed Apr. 6, 2012, all of which are incorporated herein by reference as if set out in full.

BACKGROUND

Field

The technology of the present application relates generally to electric vehicle networks, and more specifically, to electric vehicle charging stations where the energy to charge the vehicle is generated using predominately renewable energy sources as well as providing ancillary services to augment and reduce the cost associated with the station. The ancillary services may be provided by certain facilities without incorporation of an electric vehicle charging capability.

Background

As countries become more concerned with oil reserves, renewable energy, and carbon footprints, electrically powered vehicles become more popular. Electrically powered vehicles have been around for some time in the form of mass transportation systems, such as, for example, subways, trolleys, and certain trains and light rail transportation vehicles. Within the last several years, hybrid and fully electric cars have become increasingly attractive, but have not generated a significant amount of demand. Such vehicles include, for example, the Toyota Prius, the Nissan Leaf, to name but two such electric vehicles.

Electric vehicles, and particularly individual or low occupancy vehicles, have several potential benefits over gas powered internal combustion automobiles. For example, hybrid and fully electric cars generate significantly less pollution than gas powered cars. While fully electric cars produce essentially zero pollution themselves, the generation of energy to charge the cars does produce some increase in pollution, although it is difficult to attribute any specific amount to the increase in grid power. Additionally, hybrid and fully electric cars are less influenced by changes in the price of a barrel of oil, whether the oil is based on foreign or domestic production. While these are some, many other benefits exist regarding the use of hybrid or fully electric vehicles.

While several advantages exist regarding electric vehicles, consumer demand for the same has been generally lower than expected in a number of major markets around the world. One of the factors resulting in lower than expected demand is simply the costs associated with the electric vehicles and, in particular, the cost of the large battery necessary to power the vehicle. Another factor resulting in the lower demand relates to the availability of electric vehicle charging stations (EVC stations). EVC stations, unlike gas stations, are not common place in most metropolitan areas, let alone less populated and rural regions. Many uses of electric vehicles use their residential power to charge the battery, which limits the available range of electric vehicles. Also, residential power requires a significant amount of time to fully charge a vehicle battery.

To make EVC stations more readily available, electric vehicle networks are being proposed. Generally, electric vehicle networks provide for publicly-accessible EVC stations and battery stations in particular regions. The electric vehicle networks may be, depending on the locale, privately funded or governmentally funded. For example, Better Place, Inc., a corporation organized under the laws of the State of Delaware in the United States, is a venture back company whose mission is to reduce global dependency on hydrocarbons. Better Place is building an electric vehicle network that comprises multiple EVC stations in Israel. Better Place is currently contemplating the opening of electric vehicle networks in other jurisdictions as well. Another venture similar to Better Place, Inc. is Europe's Park & Charge. Park & Charge was originally funded by a European agency, but is now operated by the Electromobile Club of Switzerland.

However, even with organizations such as Better Place, Inc., Park & Charge, and others, the widespread application of EVC stations has been slow. Also, many EVC stations operate off of the electrical power grid. As much of the energy available from the electrical power grid is not renewable, and in some cases is petroleum based, even wide spread application of EVC stations connected to the grid is less than desirable as petroleum dependency and pollution reduction will in part be offset by an increase in power requirements from commercial power plants.

Ideally, EVC stations would be powered by renewable power sources, such as, for example, photovoltaic (solar) arrays or wind turbines. The EVC stations and electric vehicle networks could further reduce petroleum dependency by supplying unused energy back to the grid.

However, despite the altruistic endeavors, including those described above, the capital costs associated with placement of EVC stations that use solar or wind energy to charge the vehicles has been a hindrance in wide spread construction of EVC stations that use renewable energy. This is due, in part, to the long period of time that is required to recoup the capital construction costs by simply charging for the energy production.

Thus, against this background, there is a need to provide an improved EVC station that would augment the return on EVC stations to facilitate increased placement of renewable based EVC stations.

SUMMARY

This Summary is provided to introduce a selection of concepts in a simplified and incomplete manner highlighting some of the aspects further described in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology of the present application, a solar canopy is provided that powers, among other things, a station. The station provides data transfer between the station and client devices of data registered with the station or registered with a remote server networked to the station. The data relates to information associated with services that may be provided to the vehicle while at the solar canopy.

In other aspects of the technology of the present application, the solar canopy may further be provided with the ability to couple to a battery, which may be a vehicle battery such as an electric car or electric scooter. The solar canopy would provide electrical energy either directly to the battery or through a power conditioner and, optionally, a storage facility. The solar canopy, storage facility, or power conditioner may be provided to power equipment associated with providing services such as, for example, power refrigeration units or freezer units to allow delivery of perishable and frozen goods.

These and other aspects of the technology of the present application will be apparent after consideration of the Detailed Description and Figures herein. It is to be understood, however, that the scope of the application shall be determined by the claims as issued and not by whether given subject matter addresses any or all issues noted in the Background or includes any features or aspects highlighted in this Summary.

DETAILED DESCRIPTION

The technology of the present patent application will now be explained with reference to various figures, tables, and the like. While the technology of the present application is described with respect to using canopy structures and solar or photovoltaic panels to produce renewable energy to charge vehicles or other batteries, the technology should not be limited to the same. In particular, one of ordinary skill in the art would recognize that the technology is applicable to other renewable energy sources, or greener energy sources, such as, for example, wind power, as well as direct grid power supply. Moreover, the technology of the present application may be described with respect to charging large capacity batteries, such as, for example, those batteries used to power electric vehicles, but one of ordinary skill in the art will now recognize on reading the disclosure that the technology may be applicable to charging batteries for other devices, such as personal people movers, electric scooters, mobile processing devices, or the like. In still certain embodiments, facilities may be provided that do not include battery charging capability but simply the ability to supply some of the services described herein. These facilities may be stand alone facilities providing services, such as, for example, areas with little or no vehicle traffic like smaller sized gated communities, malls, or the like, or be integrated as service places associated with a larger EVC station network. Moreover, the technology of the present patent application will be described with reference to certain exemplary embodiments herein. The word "exemplary" is used herein to mean "serving as an example, instance, or illustration." Any embodiment described herein as "exemplary" is not necessarily to be construed as preferred or advantageous over other embodiments absent a specific indication that such an embodiment is preferred or advantageous over other embodiments. Moreover, in certain instances, only a single "exemplary" embodiment is provided. A single example is not necessarily to be construed as the only embodiment. The detailed description includes specific details for the purpose of providing a thorough understanding of the technology of the present patent application. However, on reading the disclosure, it will be apparent to those skilled in the art that the technology of the present patent application may be practiced with or without these specific details. In some descriptions herein, generally understood structures and devices may be shown in block diagrams to aid in understanding the technology of the present patent application without obscuring the technology herein. In certain instances and examples herein, the term "coupled" or "in communication with" means connected using either a direct link or indirect data link as is generally understood in the art. Moreover, the connections may be wired or wireless, private or public networks, or the like.

Figure 1:
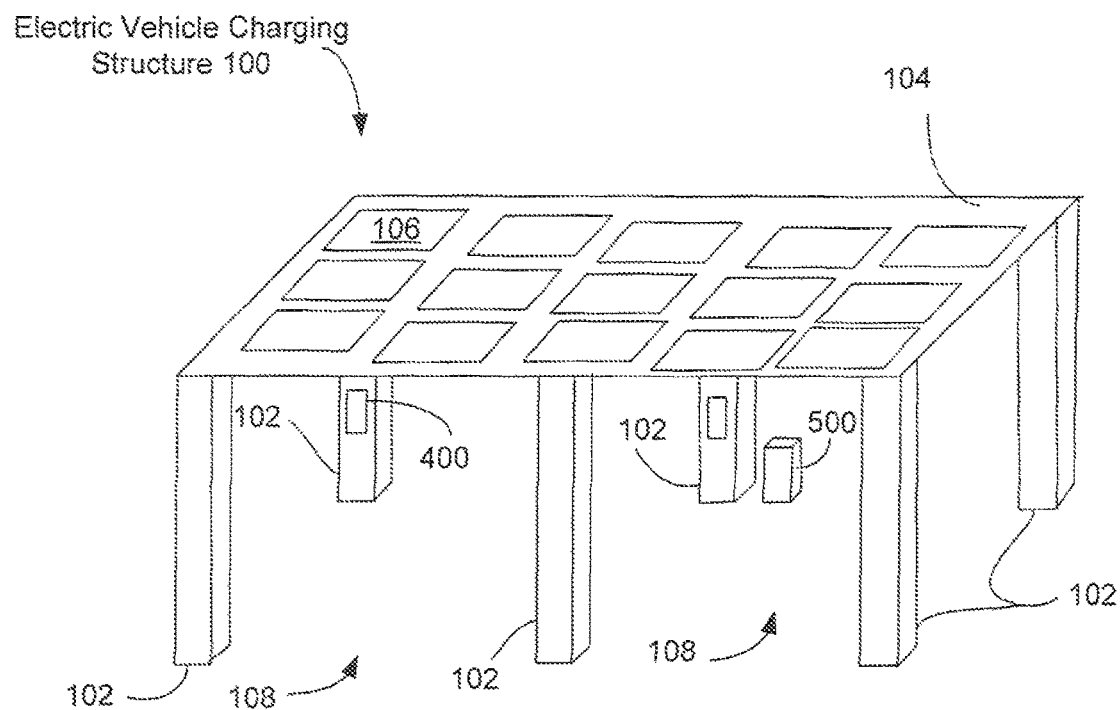
FIG. 1 is a view of a solar canopy consistent with the technology of the present application.
Figure 2:
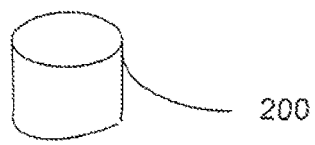
FIG. 2 is a view of a pedestal consistent with the technology of the present application.

Referring first to FIG. 1, an electric vehicle charging structure 100 consistent with the technology of the present application is provided. The electric vehicle charging structure 100 includes one or more legs 102 to support a roof structure 104. Residing on roof structure 104 are a plurality of panels 106. In the shown exemplary structure, panels 106 are solar (photovoltaic) panels. Additionally, while shown as a 3×5 array, the panels 106 may be a single large scale panel, more, or less panels as a matter of design choice. Also, while shown fixed and relatively flat on roof structure 104, the panels 106 may be mounted at an angle to effectuate a more normal face to the sun or other light source. Also, as shown in FIG. 2, one or more of the solar panels 106 may be mounted on a pedestal 200 that allows panel 106 to rotate such that the panel is more normal to the sun or other light source. As can be appreciated, the electric vehicle charging structure 100 is provided with two ports 108 to provide access for two electric vehicles to a charge station 400. More or less ports may be provided. Also, while shown as an open port, one or more walls may be provided between the support legs 102 for privacy or protection from the elements, etc. Also, roof structure 104 may be designed to allow pivoting and rotational movement instead of mounting one or more of the solar panels 106 on pedestals 200.

While electric vehicle charging structure 100 is envisioned to contain one or more solar panels, in certain embodiments, the electric vehicle charging structure 100 may comprise one or more panels 106 that are heliostats instead of photovoltaic panels. Heliostats comprise one or more mirrors or highly reflective surfaces. Heliostats reflect sunlight or other light source onto a collector and are generally used for the production of concentrated solar power. Generally, heliostats are mounted on a pedestal, such as pedestal 200, such that the heliostat reflective surface can be moved to maintain an efficient or optimum angle with the light source as the light source (typically the sun) moves throughout the day. Concentrated solar power, unlike photovoltaic panels, uses the concentrated solar energy to produce heat, typically in the form of steam or some type of gas to drive a turbine.

Figure 3:
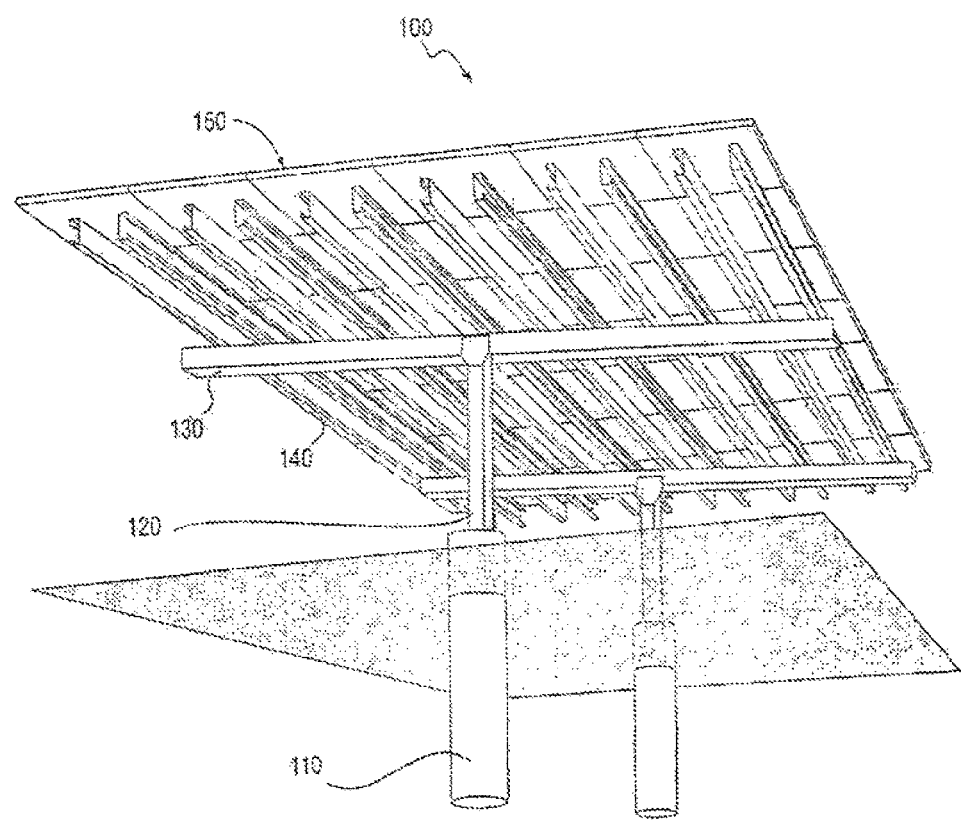
FIG. 3 is a view of a solar canopy consistent with the technology of the present application.

Referring now to FIG. 3, another electric vehicle charging structure 300 consistent with the technology of the present application is provided. The electric vehicle charging structure 300 has permanent anchors that include support legs 320 attached to foundations 310 that have an extension 310*u* under grade level, which grade is shown by the shaded portion. Support legs 320 are coupled at an upper end to a beam 330. The beam 330 has a longitudinal axis extending in a first direction 335. Supported on beams 330 are a plurality of mounting beams 340. Mounting beams 340 have a longitudinal axis extending in a second direction 345 substantially perpendicular to the first direction 335. A conventional solar panel array 350 is arranged on mounting beams 340.

Electric vehicle charging structure 100, sometimes referred to as a solar canopy, is shown presently as a permanent or semi-permanent structure. However, it would be possible to provide wheels or the like on legs 102 to allow portability. Also, the structure may be made in a modular design to allow relatively fast disassembly and reassembly. In certain embodiments, the solar panels may be attached to collapsible structures such that the solar canopies may be expanded for use in particular locales and collapsed for storage or movement.

While shown as open access structures, both structures 100 and 300 may be provided with walls and a door, such as, for example, a garage door, that may lock or be electronically controlled. In certain aspects of the technology of the present application, the bays 108 may be accessible by only certain subscribers to the electric vehicle charging network. As will be explained further below, the bay may be provided with a wireless device that establishes a communication link with a wireless device of a user attempting to access the bay. If the user has a certain membership level, loyalty, or other criteria, the bay unlocks to allow the door to open, such as by an automated door, to allow the designated user access to the bay. In certain embodiments, instead of unlocking to allow access, access may be permitted even if the membership level, loyalty, or the like is not met. For this exemplary embodiment, the improper access may result in a penalty, such as, for example, a fee to the membership account, a registered charge card, a denial of certain services, or the like.

Figure 4:
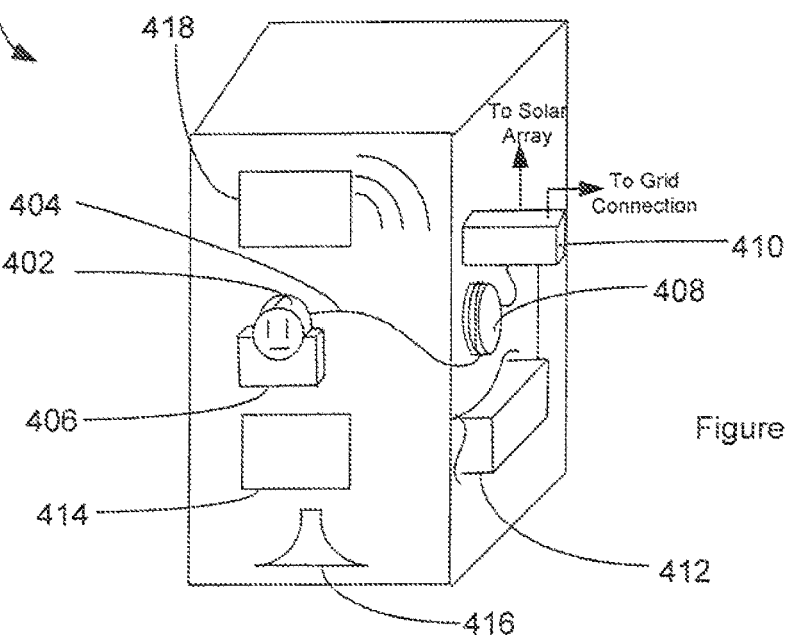
FIG. 4 is a view of a charge station consistent with the technology of the present application.

Referring to FIG. 4, a charge station 400 is shown in more detail. Charge station 400 includes a plug 402 and cord 404 adapted to be coupled to a battery, such as an electric car vehicle battery or another battery. The plug 402 includes a cradle 406 for the plug and a reel 408 that allows the cord to be extended and retracted. The cord is connected to the plug 402 on a first end and connected to a power conditioner 410 on a second end. The plug 402 could be either a male or a female plug. Alternatively, a plurality of plugs 402 may be provided where a certain number of plugs 402 are male and a certain number of plugs 402 are female. Also, cord 404 does not need to be extendable or retractable as the electric vehicle may have a plug that is coupled to an extendible cord. In these instances, the reel 408 may be optional and the plug 402 may be integrated to the charge station 400 without a cradle 406.

The power conditioner 410 provides the circuits, transformers, rectifiers, and the like necessary to convert the energy from the solar cells into a form conducive to charging the appropriate battery. Depending on the technology, the conditioning may or may not be necessary. While shown as coupled to the solar array, the power conditioner 410 may be connected to other forms of energy, such as, an electrical grid, a wind turbine generator, a concentrated solar reactor generator, etc. Additionally, the power conditioner 410 may accept inputs from multiple power sources, such as, for example, a combination of one or more of a solar array, a diesel generator, a battery, a power grid, a wind turbine, or the like. The power conditioner 410, as shown, is coupled to both plug 402 and storage facility 412. Storage facility 412 may be contained in charge station 400, removable therefrom, or accessible in some fashion, such as by opening a panel on charge station 400. Storage facility 412 may be a stand alone cabinet coupled to the charge station 400 as well. Storage facility 412 may include one or more high capacity energy storage devices (not specifically shown) to store energy when no load is attached to plug 402. Storage devices also may receive energy to store when a load is coupled via plug 402 or the like if the energy produced by the power supply is sufficient. The high capacity energy storage devices may be in certain embodiments one or more vehicle batteries, such as, for example, vehicle batteries that may hold a charge, but are considered to be at the end of life for one or more reasons. Instead of coupling plug 402 to power conditioner 410, plug 402 may connect to the storage facility 412 to supply power to vehicles or the like. In this exemplary embodiment, the energy source, such as photovoltaic panels 106, would charge the high storage capacitors or batteries in storage facility 412 and the energy to charge the vehicle battery, or the like, would be supplied via the energy stored in the storage facility 412. Notice, in certain embodiments, a cabinet may be provided with replacement vehicle batteries such that instead of charging the battery, a user could swap a drained battery for a charged battery.

While not specifically shown, the EVC stations 100 may include electrical accessories that are coupled to the solar panels 106, the power conditioner 410 and/or the storage facility 412. The energy from one or more of these devices would power the electrical accessories. Such electrical accessories include the electronics to be described hereinbelow, but also could include, without limitation, automatic doors, such as a conventional residential automatic garage door, lights, cellular micro arrays or towers, refrigeration units, high volume air conditioning equipment, to name but a few samples of possible electrical accessories. The electrical accessories may include one or more processors, such as a server, chip-sets, computers, as is generally known, which will be explained in more detail below, that power, for example, a graphical user interface 414 on charge station 300. Graphical user interface (GUI) 414 (not shown in any particular detail) may allow for input of data to fields on the GUI 414 using, for example, touch, such as by a touch screen, a light pen, a keyboard, or mouse, as are conventionally known and not shown in any particular detail herein. In one embodiment, the GUI 414 may allow a user of the equipment to select a charge level (such as 120V charge, 220V charge, 440V charge or the like, while the examples are typical multiples of residential power, other derivations of power are possible). The charge levels may be associated with the type of battery to be charged, such as an electric car battery charge may be selected at 440V; whereas, a mobile processor charge may be selected at 120V. The selection may be designated by the type of device and the processor (described below) would provide the proper output to plug 402. For example, the plug 402 may be selectively coupled to a plurality of output ports on power converter 410 or a single output from power converter 410 may have a variable resistive load to control the voltage level out of the power converter 410.

The electrical accessories may include a server 416, a radio transceiver 418, such as a conventional micro array or cellular towers, a WiFi access port, or any other wireless devices capable of interfacing with the Internet, such as, for example, a satellite transceiver or the like. The devices may subsequently connect to the Internet as will be explained below.

Power conditioner 410 also may be connected to the grid, as shown. Energy above the storage capability of the station may be sold to electric companies or local merchants, homes, or facilities (such as street light, signs, etc). In certain aspects, the technology of the present application may relate to directly powering street lights, traffic lights, signs, or local buildings instead of being provided with capabilities to charge electric vehicles or other batteries.

As can be appreciated, the capital costs associated with construction and installation of the above described solar canopies may be high and in some instances cost prohibitive. Thus, it is necessary to provide mechanisms, tools, and systems that are capable of offsetting the costs. In some embodiments, costs may be offset by a connection between the solar panels and the power grid such that extra energy may be sold to utilities. However, selling energy to the grid typically requires years before the capital costs are offset. Thus, the technology of the present application relates to providing location based services (such as the delivery of goods and services) coordinated with the solar canopy, which will be explained in more detail below. The solar canopy will have one or more processors, servers, computers, mobile computing devices, and wireless transceivers that can coordinate with customers or users of the solar canopy as will be explained. Once the server associated with the solar canopy handshakes or couples to a user's mobile or car based device, the solar canopy may provide delivery of goods, services, and the like to the user on a fee based system to offset the capitol costs of constructing the solar canopy. To reduce the capital construction costs, certain solar canopies may be provided (at least initially) without the ability to charge vehicles or other batteries. Rather the solar canopy would provide what have been described as ancillary services. Once a revenue stream is established using the ancillary services, the solar canopies may be retrofitted with the capability to charge vehicles or other batteries.

Figure 5:
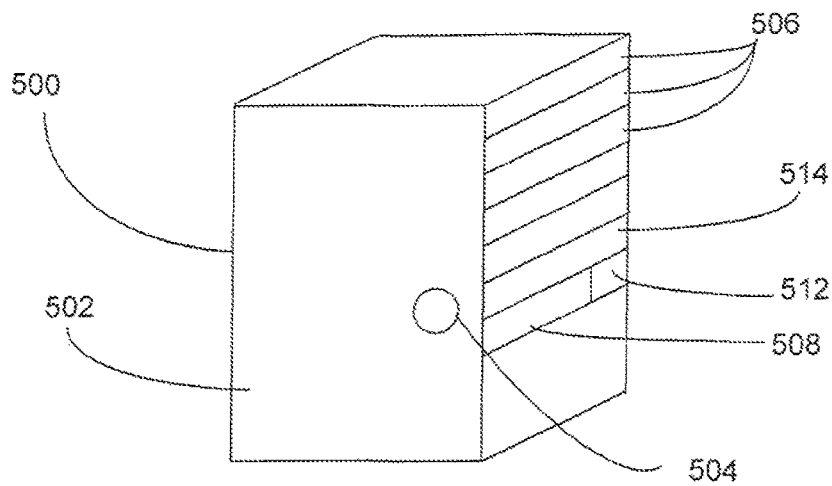
FIG. 5 is a view of a storage box associated with the solar canopy consistent with the technology of the present application.

For the delivery of goods and services (especially goods), the EVC station 100 may include a lock box 500 as shown in FIG. 5. Lock box 500 includes a door 502 movable between an open and closed position that includes a lock 504. The lock 504 may be a conventional combination or key based lock or may be an electronic lock that is controllable by an electrical signal from a processor as will be explained further below. In one embodiment, the electronic lock may be an electromagnetic lock that is activated or deactivated based on a signal to energize the magnets (lock) or de-energize the magnets (unlock). Additionally, to allow multiple users, the lock box 500 may include a plurality of storage bins 506. The storage bins may have individual locked access and may be slidable on rails or the like to facilitate access. One or more of the storage bins may be a refrigeration bin 508. A refrigeration unit 510 containing the equipment necessary to operate refrigeration bin 508 may be contained in the lock box 500 or be a separate compartment to contain the equipment, including the compressors, heat exchangers, condensers, etc. In certain embodiments, a plurality of lock boxes may be provided such that certain of the lock boxes can be associated with the refrigeration unit 510 and others of the lock boxes can be separate from refrigeration. The refrigeration bin 508 may include a freezer section 512 or the lock box 500 may include a separate freezer bin 514.

Figure 6:
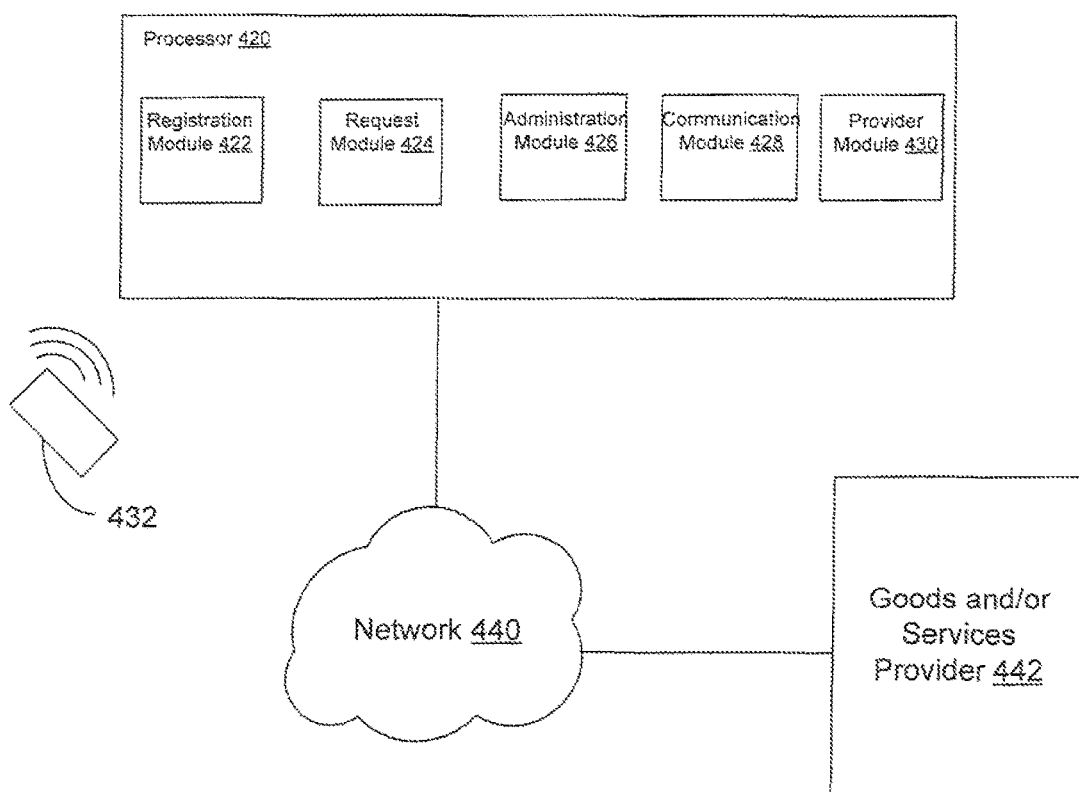
FIG. 6 is a functional block diagram of a processor associated with the technology of the present application.

A processor 420, as shown in FIG. 6, may provide an interface that a client or user can interact with to order goods and/or services. Each of the processor and modules may provide a unique function and may operate using, for example, a computer system such as the computer system described below with reference to figure COMPXFIG or a network architecture as described below with reference to NETXFIG. The interface may be provided as, for example, a website with editable fields available on the GUI 414 or the interface may be associated with a client device 432 that is in communication with the processor 420. The processor 420 would be connectable to a network 440, such as the Internet, to allow the transmission of delivery requests from the processor 420 through the network 440 to the provider 442. The request may be through the Internet using a batch upload, email, text message, telephone call or the like. The request, which will be explained in more detail below, would be associated with a particular processor or structure such that the provider 442 would be able to identify a delivery location. The goods and services provided may be in any number of industries including the delivery of food, such as, for example, groceries, medicines, such as, for example, from a pharmacy, automotive supplies, such as, for example, a tune up, clothier services, such as, for example, tailor or dry-cleaning, or the like, limited only by one's imagination of potentially deliverable goods and services. The processor 420 may include a registration module 422, a request module 424, an administration module 426, a communication module 428, and a provider module 430. The processor 420 may interact with a client device 432, such as a smartphone, mobile computing device, conventional cellular telephone, or the like, to allow an application residing on the client device 432 to interact with the request module 424 to allow the purchase of goods/services via a transmission from the client device 432 instead of, for example, a GUI 414 associated with the charge station 400. The processor 420 may include any one of the identified modules, other modules; the modules may be co-located or remotely located; the modules may be combined into less or separated into other modules as required by a particular architecture.

The processor 420 may include a registration module 422. The registration module 422 may operate similar to a login system to identify a registered user's account. A registered user may be advantageous to allow for the user to provide a payment mechanism, such as, for example, a credit card, a pre-paid account, a paypal account, etc. In certain embodiments, the client device 432 will have a corresponding application running on the client device that will automatically register the user with the appropriate account information. Alternatively to being a registered user, a non-registered user may access the processor 420 and provide payment information at the time of requesting a good or service.

One of many possible advantages of being a registered user of the technology described in the present application involves earning, for example, reward points or the like. In certain embodiments, for example, multiple solar canopies may be provided in a parking area, deck, or the like. Each solar canopy may be ranked for use by bronze, silver, and gold members having certain levels of loyalty points. In this exemplary embodiment, the bronze solar canopies may be associated with less desirable parking spaces, such as those with a farther walk; whereas, gold solar canopies would be more desirable. The loyalty points awarded for use of the system may provide bronze members with access to silver and gold solar canopies having relatively better parking spaces. Also, the more use of the system may provide discounts or the like for delivery of services.

The processor 420 may include the request module 424. The request module 424 provides a user interface with options to search for goods or services that may be requested. The user interface may comprise, for example, a graphical user interface, such as, GUI 414, that is navigated using a mouse, a stylus, a touch screen, a keyboard or the like. Typically, the request module 424 would provide a menu of potential items and services that may be requested and/or provide for inputting key items to allow for searching meta data or the like. Key items may include images, key words, pre-set parameters etc. For example, menu items for "groceries" may be provided in the interface. Selecting the groceries menu item may provide a list of available providers. Selecting the provider may allow the user to select particular groceries, such as fruits, vegetables, cereals, breads, liquids, etc. The interface may be pushed to the client device 432 or coordinate with an application residing on client device 432. The goods and services may be selectable or searchable based on many different criteria including, for example, merchant or manufacturer name, category, country, city, state, zip code, price, proximity, etc.

The administration module 426 provides an administrator to manage the service provided through the structures and processor 420. The administrator module may monitor merchant and user accounts and invoice the same as required including running transactions via payment mechanisms, such as, if a non-registered user swipes a credit card or the like. The provider module 430 provides a mechanism to allow a merchant to monitor its account. The merchant would be provided a unique identification or may select a unique identification code. The provider module 430 may allow the providers to monitor the number and type of advertisements transmitted, redemptions of the advertisements, costs, times of transmissions, etc. The communication module 428 may provide communication between the various devices and networked connections. For example, the communication module 428 may coordinate the access of external websites via the network 440, such as via the Internet, may coordinate the communication to the client device 432, etc.

In certain aspects of the technology of the present application, the processor 420 may store in a memory, such as a system memory, the number of client devices 432 that enter and/or exit a service area of processor 420 for any given predetermined amount of time, such as a 24 hour period, a 30 minute period, a 3 day period, or the like. The service area of processor 420 for the purposes of this exemplary description of the technology may be any device that is within handshaking wireless access of the processor 420. Registering this information may allow the advertiser to identify the number of potential customers entering a particular geographical area or locale, which may be associated with even a single storefront in, for example, a mall setting. However, while it is possible to monitor the number of unique client devices 432 that enter a service area, such information is potentially limiting in that a single family of 3 or more potential customers may collectively only have a single client device 432, such as a single cellular telephone, smartphone, or other mobile computing device. Similarly, a single individual in today's market may have several client devices 432. Each of which may offset the value of counting particular client devices.

Canopies 100 or 300 may be mounted with a camera, video recorder, thermal imaging, infrared beams, weight or pressure sensors, or the like to count the number of individuals (or vehicles) that pass within the video surveillance area of the camera. In these cases, processor 420, for example, would be programmed to recognize certain images as individuals or vehicles. Using this information, it may be possible to count the number of people or vehicles that access an area regardless of whether they have a client device 432. To the extent cameras are used to image individuals or vehicles, one particularly useful imaging device may include the KINECT® imaging system available from Microsoft, Inc., either alone or in combination with other imaging devices. The KINECT imaging device may be particularly useful as it can track an individual's movements as it interacts with the systems described herein. Vehicles also may be counted by, for example, a sensor cable placed across an access point instead of via a camera or imaging device that measures the number of axles that cross the cable. Moreover, processor 420 may be provided with or have access to facial recognition software. Thus, a high resolution camera may be capable of providing not only the number of people that pass a particular canopy, but in certain aspects, may be capable of providing metrics relating to the individual. The metrics may include sex, race, ethnicity, age, height, weight, or the like. In still certain aspects, the facial recognition may allow for identification of particular individual's identities.

Figure 7:
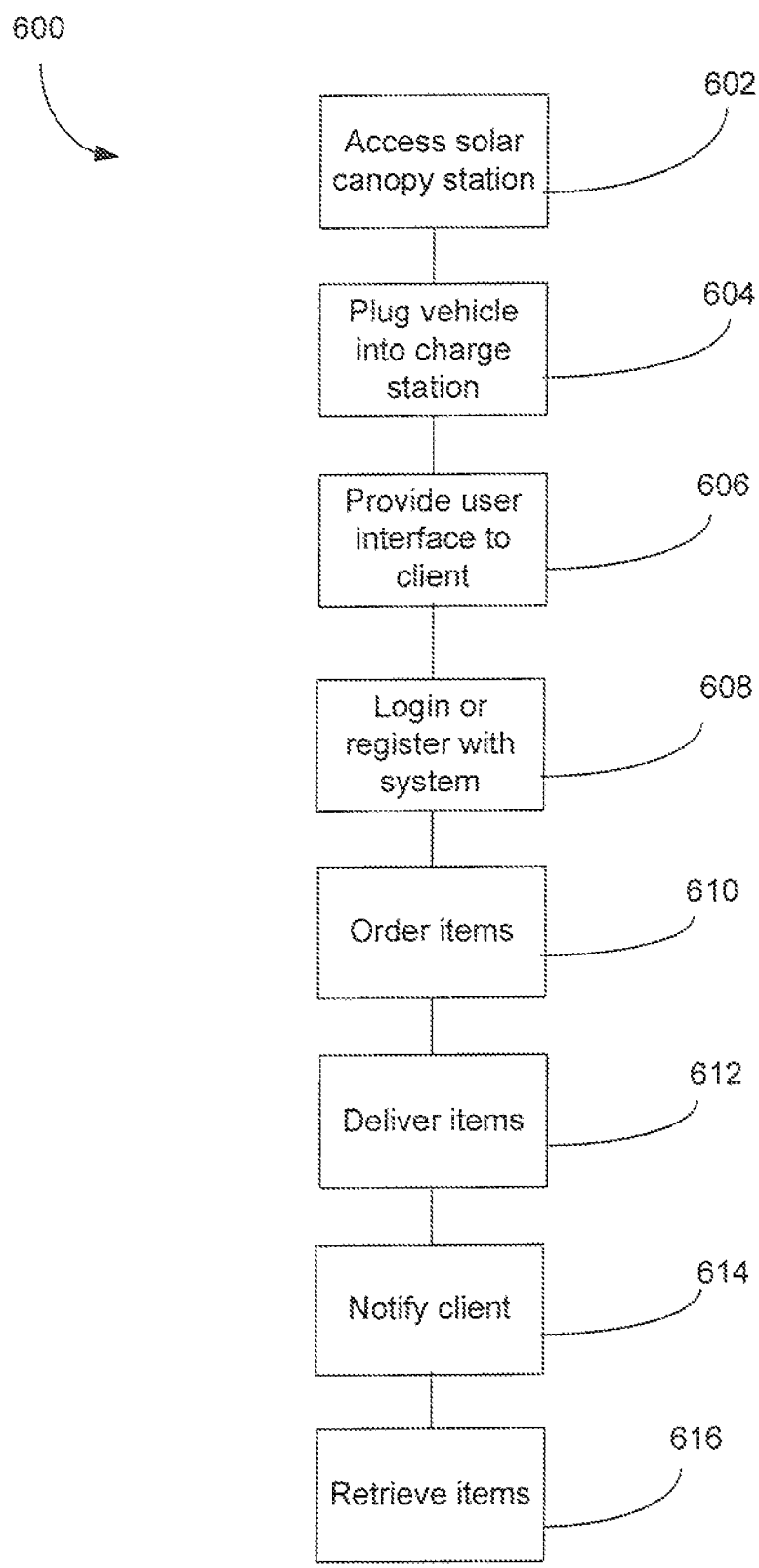
FIG. 7 is a methodology associated with using the technology of the present application.

Referring now to FIG. 7, an exemplary method 600 of using the technology of the present application is provided. A step 602 includes accessing the port 108 by, in certain exemplary embodiments, driving an electric vehicle into the port 108. In a step 604, the client plugs the electric vehicle to the plug 402. Once plugged, the system may generate a user interface to allow the client to interact with the system, step 606. The client may, for example, login or otherwise register with the system to obtain delivery of goods and services, step 608. The registration may be inclusive of providing payment information. Alternatively, payment information may be requested after specific goods and services are requested.

Once initiated, the client would order the delivery of goods and services that are available via the system, step 610. The ordering step may include drilling down through a selection of menus for items, may include providing a list of items, may include an interaction between the client and the provider using, for example, an exchange of emails, a chat technology, instant messaging, or SMS technology. The provider would deliver the ordered items, step 612. If a lock box is provided with restricted access, the provider would use a key or electronic code to open the lock box and place the items in the lock box as required. In certain situations, such as, for example, laundry services, the service provider may need to retrieve the items prior to completing the service. Optionally, a notification may be provided to the client that the ordered items have been delivered, step 614. Finally, the client would retrieve the items from the storage facility, such as the lock box, step 616. The retrieval may involve providing an access code to the lock box to disengage the lock. In certain embodiments, the retrieval code to disengage the lock may be provided via a text message or email. Alternatively, the client may notify the service provider that they are ready to retrieve the items and the service provider would send a signal to disengage the lock. In still other embodiments, the client device would interact with the lock box to disengage the locks when the client device is in close proximity to the lock box.

While described with relation to ordering the goods and/or services at the time of interaction with the solar canopy structure, a client may subsequently order items. For example, if remotely accessing the system, the client would access the system remotely via an Internet, either using a conventional desktop computer, a mobile computer, or smartphone. The client would follow the same general procedure as identified but would need to identify the solar canopy, via a designation or other number, so the provider would know where to deliver the goods and/or services. In certain aspects of the technology, a user would register with the service by downloading an application to client device 432. The application running or capable of being activated by a signal would interact with processor 420 when within range of the wireless device to facilitate the establishment of a communication link between the device and the processor.

Figure 8:
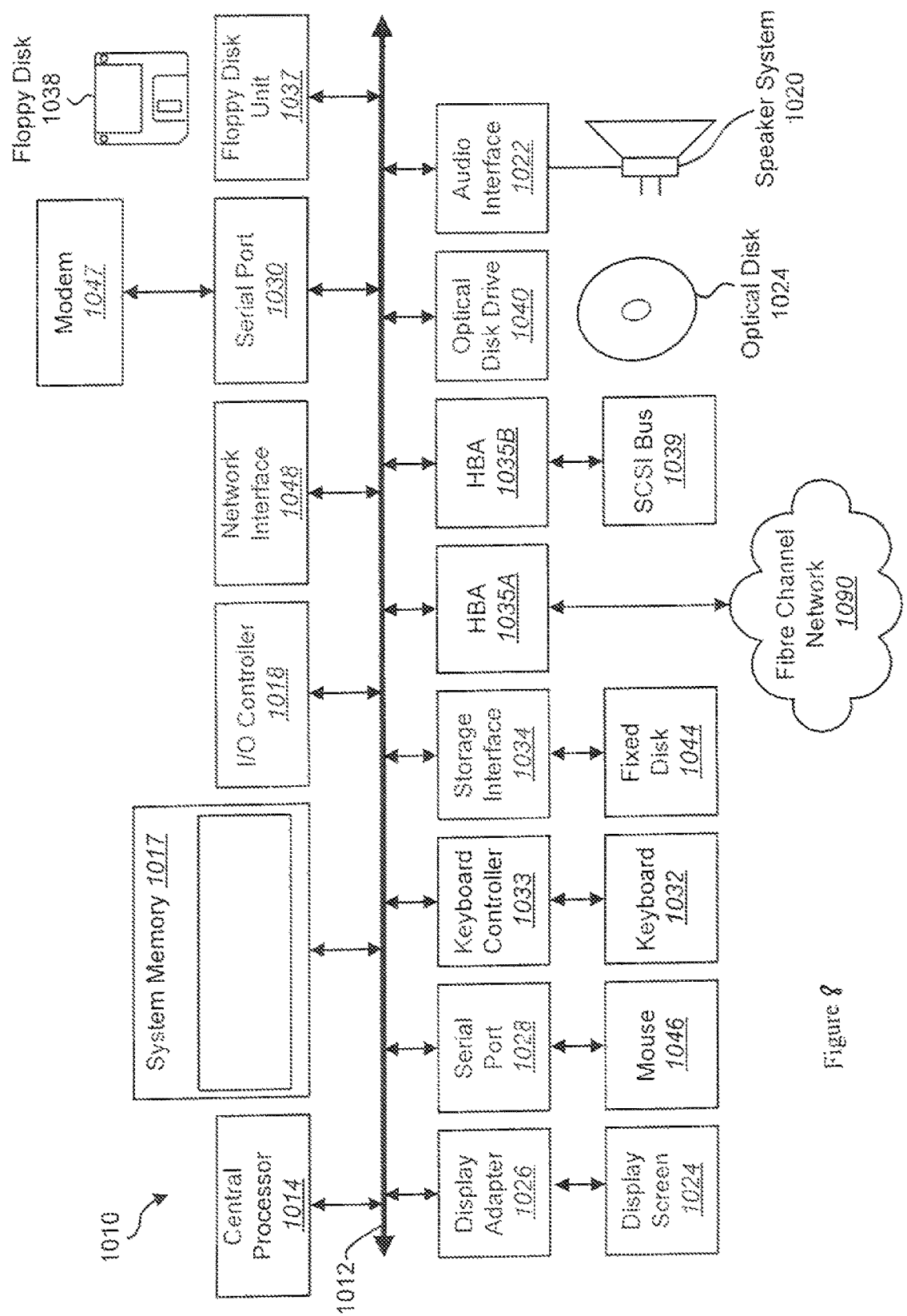
FIG. 8 is a functional block diagram of a system capable of embodying portions of the technology of the present application.

FIG. 8 depicts a block diagram of a computer system 1010 suitable for implementing the present systems and methods. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), multiple USB devices 1092 (interfaced with a USB controller 1090), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the gifting module 104 to implement the present systems and methods may be stored within the system memory 1017. Applications resident with computer system 1010 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an Internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present systems and methods. The devices and subsystems can be interconnected in different ways from that shown in FIG. 8. The operation of a computer system, such as that shown in FIG. 8, is readily known in the art and is not discussed in detail in this application. Code to implement the present disclosure can be stored in computer-readable medium such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or another known operating system.

Figure 9:
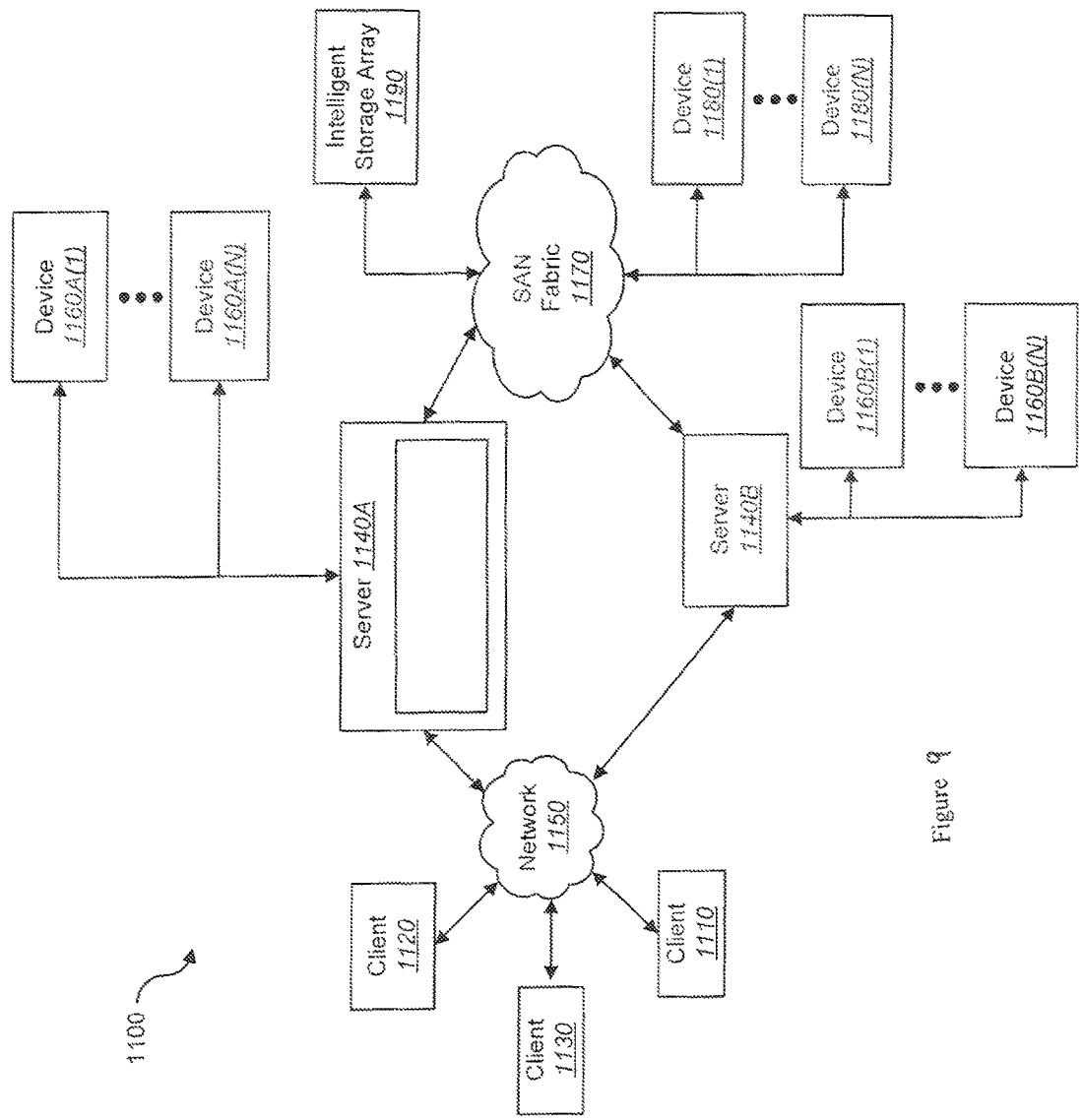
FIG. 9 is another functional block diagram of a system capable of embodying portions of the technology of the present application.

FIG. 9 is a block diagram depicting a network architecture 1100 in which client systems 1110, 1120 and 1130, as well as storage servers 1140A and 1140B (any of which can be implemented using computer system 1110), are coupled to a network 1150. In one embodiment, the gifting module 104 may be located within a server 1140A, 1140B to implement the present systems and methods. The storage server 1140A is further depicted as having storage devices 1160A(1)-(N) directly attached, and storage server 1140B is depicted with storage devices 1160B(1)-(N) directly attached. SAN fabric 1170 supports access to storage devices 1180(1)-(N) by storage servers 1140A and 1140B, and so by client systems 1110, 1120 and 1130 via network 1150. Intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120, and 1130 to network 1150. Client systems 1110, 1120, and 1130 are able to access information on storage server 1140A or 1140B using, for example, a web browser or other client software (not shown). Such a client allows client systems 1110, 1120, and 1130 to access data hosted by storage server 1140A or 1140B or one of storage devices 1160A(1)-(N), 1160B(1)-(N), 1180(1)-(N) or intelligent storage array 1190. FIG. 10 depicts the use of a network, such as the Internet, for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

I claim:

1. A method performed on at least one processor of delivering at least one of goods or services to a vehicle location of a customer, the method comprising the steps of:
   providing a renewable energy structure that generates electrical power using at least one renewable energy source;
   powering at least one processor having a known location using electrical energy generated by the renewable energy source, the at least one processor to display a graphical user interface to a customer proximate a renewable energy structure, the graphical user interface comprising at least one interactive field;
   receiving through the graphical user interface data input to the at least one interactive field, the data input comprising a request for delivery of at least one good or service;
   generating a delivery request from the data input to the at least one interactive field; and
   transmitting from the at least one processor a delivery request to a provider,
   wherein the provider delivers the requested good or service to the known location.

2. The method of claim 1 further comprising selecting the provider from a plurality of providers to process the delivery request.

3. The method of claim 2 wherein the selection is based on the provider of the plurality of providers closest to the known location.

4. The method of claim 1 wherein the delivery request comprises a request for delivery of at least one good.

5. The method of claim 4 wherein the provided renewable energy structure comprises a storage box and the method further comprises receiving the delivery of the at least one good.

6. The method of claim 5 further comprising the step of automatically locking and unlocking the storage box for the delivery and retrieval of the at least one good.

7. The method of claim 1 further comprising the step of a user registering payment information with an account to automatically pay for the delivery of the at least one good or service.

8. The method of claim 1 further comprising the step of the registering a plurality of providers wherein the step of registering the provider comprises identifying the at least one good or service each of the plurality of providers provides.

9. The method of claim 8 further comprising the step of searching the registered plurality of providers.

10. An apparatus comprising:
a renewable energy generation structure;
at least one processor contained in the renewable energy generation structure that receives power from the renewable energy generation structure; and
a storage facility contained in the renewable energy generation structure;
the at least one processor comprising:
at least one registration module to store data regarding at least one user and to store data regarding at least one provider;
a graphical user interface, the graphical user interface comprising at least one interactive field for the input of data; and
a communication module to transmit data input through the at least one interactive field to the at least one provider.

11. The apparatus of claim 10 wherein the storage facility comprises a plurality of bins.

12. The apparatus of claim 10 wherein the storage facility comprises a refrigerator.

13. The apparatus of claim 12 wherein the storage facility further comprises a freezer.

14. The apparatus of claim 10 wherein the renewable energy generation structure comprises a charging station connectable to at least one battery.

15. The apparatus of claim 14 wherein the at least one battery is a vehicle battery.

16. The apparatus of claim 10 wherein the renewable energy generation structure comprises a solar canopy.

17. The apparatus of claim 16 wherein the solar canopy comprises at least one photovoltaic cell.

18. The apparatus of claim 17 further comprising at least one imaging device, wherein the at least one imaging device provides images to the at least one processor of an imaged area and the at least one processor comprises an identification module to identify people that enter the imaged area.

* * * * *